(12) United States Patent
Ohsawa

(10) Patent No.: US 6,607,048 B2
(45) Date of Patent: Aug. 19, 2003

(54) MOTOR ASSISTING APPARATUS FOR VEHICLE

(75) Inventor: Hiroshi Ohsawa, Shizuoka-ken (JP)

(73) Assignee: Suzuki Motor Corporation, Hamamatsu (JP)

( * ) Notice: Subject to any disclaimer, the term of this patent is extended or adjusted under 35 U.S.C. 154(b) by 66 days.

(21) Appl. No.: 09/796,019

(22) Filed: Feb. 28, 2001

(65) Prior Publication Data
US 2001/0017226 A1 Aug. 30, 2001

(30) Foreign Application Priority Data
Feb. 28, 2000 (JP) ........................... 2000-050937

(51) Int. Cl.[7] ............... B60K 6/02; B60K 1/02
(52) U.S. Cl. ............................. 180/65.2; 477/3
(58) Field of Search ................ 180/65.2, 65.3, 180/65.4, 65.6, 65.1; 477/5, 2, 3

(56) References Cited

U.S. PATENT DOCUMENTS

| 6,026,921 | A | * | 2/2000 | Aoyama et al. | ........... | 180/65.2 |
| 6,077,186 | A | * | 6/2000 | Kojima et al. | ........... | 477/3 |
| 6,116,363 | A | * | 9/2000 | Frank | ........... | 180/65.2 |
| 6,116,364 | A | * | 9/2000 | Taguchi et al. | ........... | 180/65.2 |
| 6,258,001 | B1 | * | 7/2001 | Wakuta et al. | ........... | 475/5 |
| 6,338,391 | B1 | * | 1/2002 | Severinsky et al. | ........ | 180/65.2 |
| 6,373,155 | B1 | * | 4/2002 | Shimizu et al. | ........... | 310/68 |
| 6,373,206 | B1 | * | 4/2002 | Morimoto et al. | .......... | 318/139 |

FOREIGN PATENT DOCUMENTS

JP  11078555  3/1999

* cited by examiner

Primary Examiner—Brian L. Johnson
Assistant Examiner—Jeffrey Restifo
(74) Attorney, Agent, or Firm—Flynn, Thiel, Boutell & Tanis, P.C.

(57) ABSTRACT

A motor assist apparatus for a vehicle having a motor for assisting driving force of an internal combustion engine. The motor assist apparatus is built in a motor housing installed between a cylinder block of the engine and the case of the transmission. The motor housing has a length in the cylinder line direction which is equal to the distance between the centers of cylinders of the engine. As a result, the motor assist apparatus can utilize a part of an engine with one more cylinder when adapting the motor assist apparatus to the vehicle engine.

9 Claims, 8 Drawing Sheets

MOTOR ASSISTING APPARATUS FOR VEHICLE

FIELD OF THE INVENTION

This invention relates to a motor assist apparatus for a vehicle, and particularly to a motor assist apparatus connected in series between the vehicle engine and the transmission and sized lengthwise so as to correspond to the spacing between adjacent cylinders of the engine to permit use of common parts from an engine with one additional cylinder.

BACKGROUND OF THE INVENTION

There is known a vehicle having a motor assist apparatus for assisting driving force of an internal combustion engine which functions as a power source for the vehicle. The motor assist apparatus assists driving force of the engine according to a driving state. Such motor assist apparatus attains improvements of output and fuel efficiency of the engine, and can lower detrimental components in engine exhaust gases.

One example of such a motor assist apparatus for a vehicle is disclosed in published Japanese Patent Application Laid-Open No. 11-78555. The motor assist apparatus connects a motor generator, a flywheel and a transmission with a crankshaft in this order. A starter motor is connected with a ring gear on an outside of the flywheel, and the starter motor is mounted to an internal-combustion engine through a case of the transmission.

When adapting a usual motor assist apparatus to a vehicle, the engine, the transmission and the parts which mount the motor assist are prepared exclusively to accommodate the motor assist apparatus. As a result, this causes costs to increase due to the number of parts and facilities required.

To obviate or minimize the above inconvenience, the present invention provides a motor assist apparatus for a vehicle and having the motor for assisting driving force of an engine, which apparatus is built in a motor housing installed between a cylinder block of the vehicle engine and a case of the vehicle transmission, and which motor housing has a predefined or set length in the cylinder line direction so as to be equal to the distance between the centers of cylinders of the engine.

In a motor assist apparatus for a vehicle according to this invention, the motor housing is installed between the engine cylinder block and the transmission casing, and has a length in the cylinder line direction (i.e., the direction of the crankshaft axis) which is equal to the distance between the centers of cylinders of the engine, whereby the length of the engine with the motor assist apparatus in the cylinder line direction can be coordinated so as to be the same length as an engine having one more cylinder. For example, this motor assist apparatus can be coordinated so that the length of a 3-cylinder engine having a motor becomes the same as the length of 4-cylinder engine. By the way, in the engine to adopt this motor assist apparatus, it is possible to utilize a part of engine being one cylinder more than this engine.

DETAILED DESCRIPTION

The invention will be described with reference to FIGS. 1 to 6 which illustrate a first embodiment of this invention.

Figure 3:
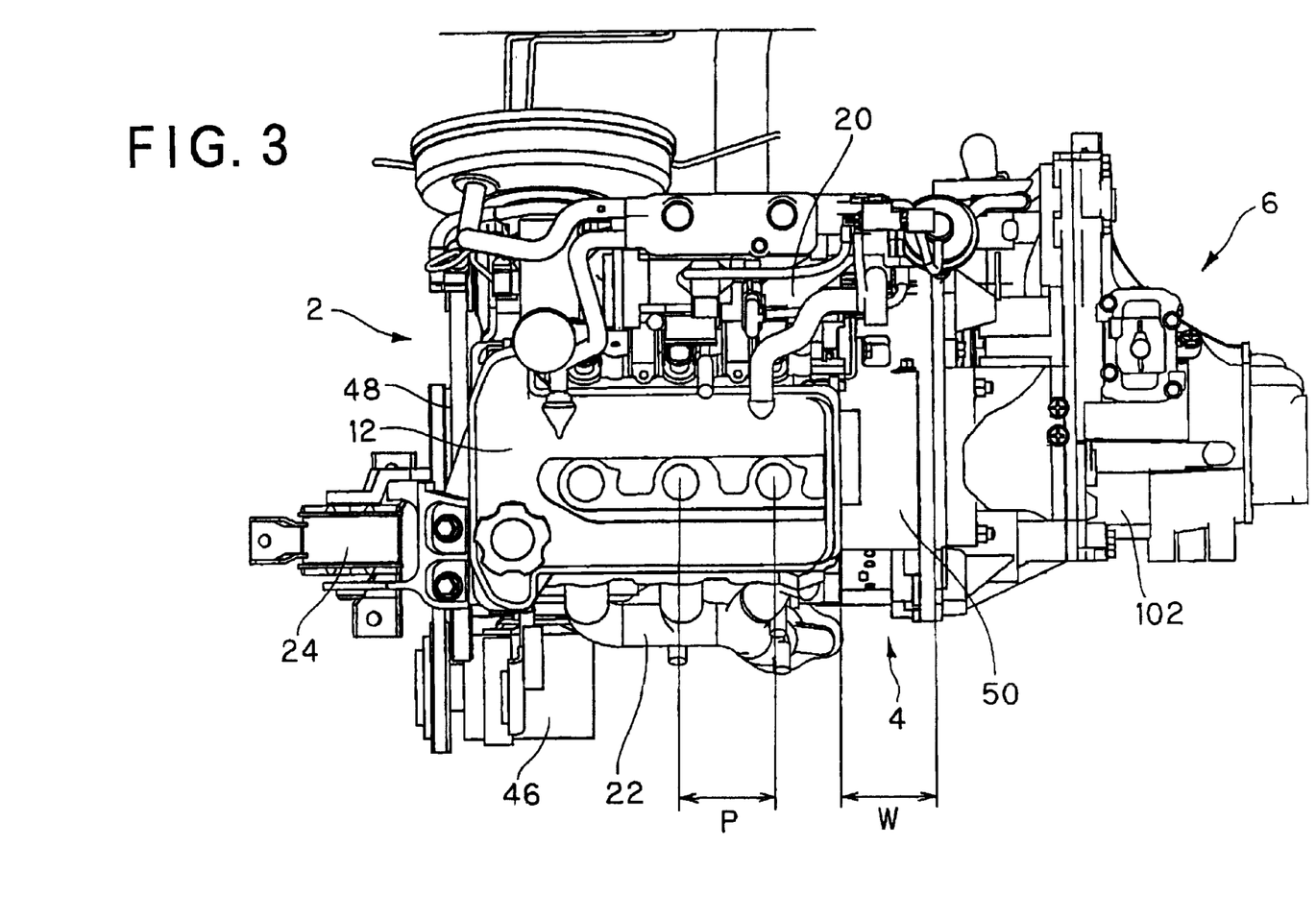
FIG. 3 is a plan view of the engine shown in FIG. 1.
Figure 4:
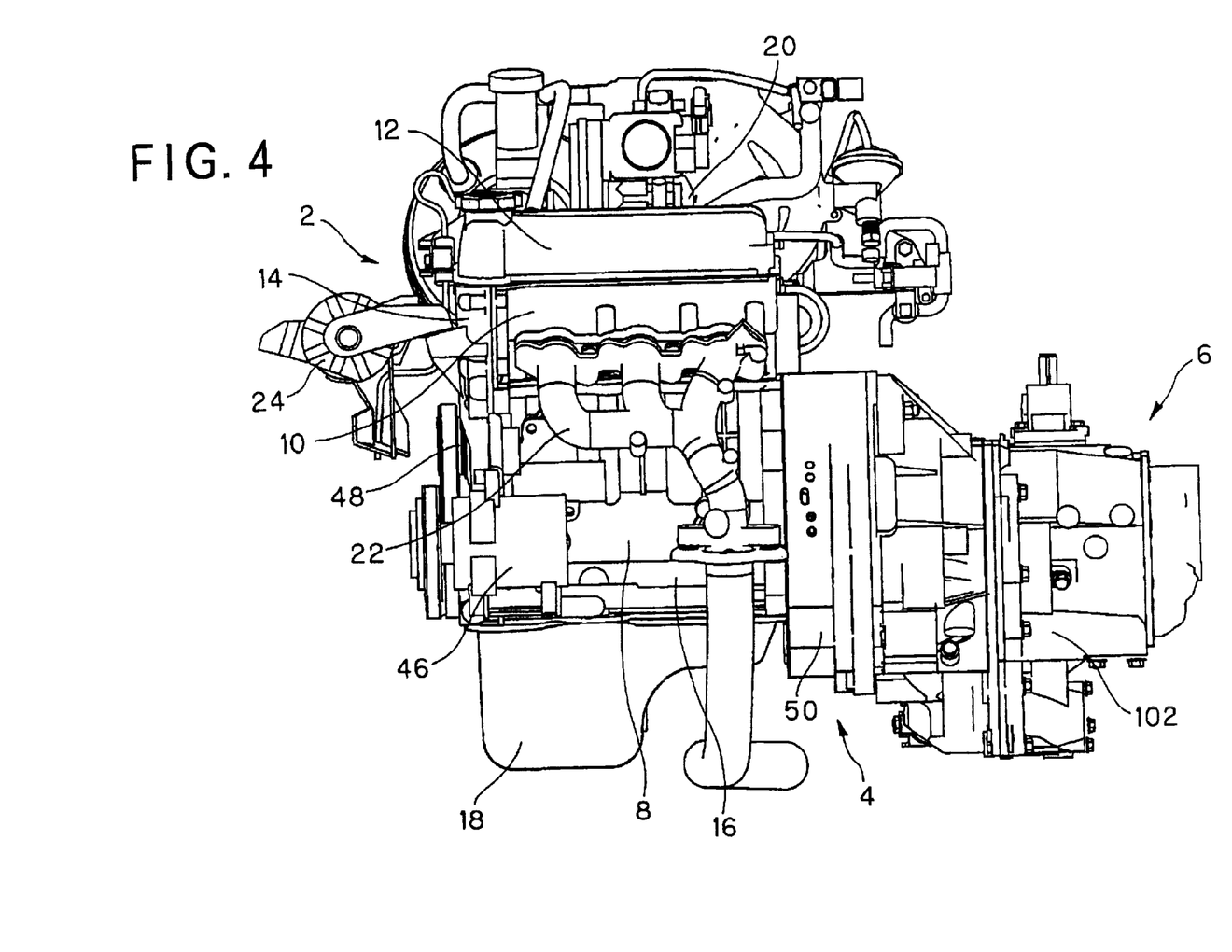
FIG. 4 is a front view of the engine shown in FIG. 3.

In FIGS. 3 and 4, reference numeral 2 denotes an internal combustion engine disposed in a vehicle (not shown); 4 a drive or motor assist apparatus for a vehicle; and 6 a transmission. The engine 2 is a 3-cylinder engine with three cylinders 28 arranged in series along the crankshaft axis. The engine 2, the motor assist apparatus 4 and the transmission 6 in this order are connected in series along the cylinder line direction.

The engine 2 as shown in FIG. 4 has a cylinder block 8, a cylinder head 10, a head cover 12, a chain cover 14, a lower case 16 and an oil pan 18. An intake manifold 20 and an exhaust manifold 22 are installed on the cylinder head 10, and an engine mount 24 is installed on chain cover 14.

Figure 1:
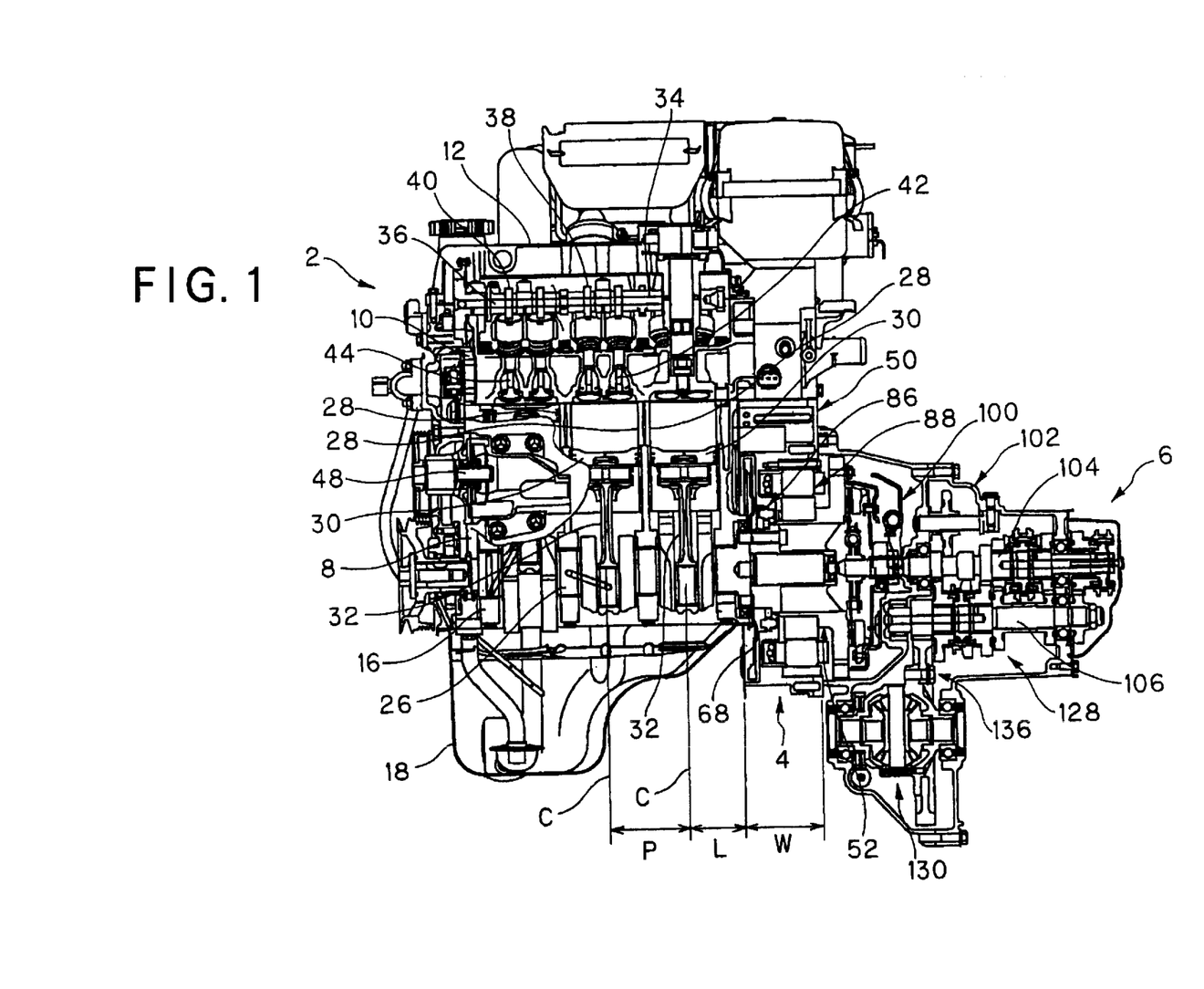
FIG. 1 is a cross-sectional view of an engine and showing a first embodiment of a motor assist apparatus for a vehicle according to this invention.

The engine 2, as shown in FIG. 1, has a crankshaft 26 supported by lower case 16 in a lower section of the cylinder block 8. The engine 2 has three cylinders 28 arranged in series in cylinder block 8 and aligned in the lengthwise direction of the engine, i.e., the direction of the crankshaft axis. In the engine 2, a piston 30 is disposed in each cylinder 28 so as to slide smoothly, and the piston 30 is connected to the crankshaft 26 by a connecting rod 32.

In addition, the engine 2 has an intake camshaft 34 and an exhaust camshaft 36 rotating in synchronization with the crankshaft 26, and these camshafts are supported in cylinder head 10. The intake camshaft 34 and the exhaust camshaft 36 respectively have an intake cam 38 and an exhaust cam 40 corresponding to each cylinder 28, for respectively driving an intake valve 42 and an exhaust valve 44 of each cylinder 28. Furthermore, in the engine, as shown in FIGS. 3 and 4, an alternator 46 and a water pump 48 are disposed as supplement apparatus driven by crankshaft 26.

Figure 2:
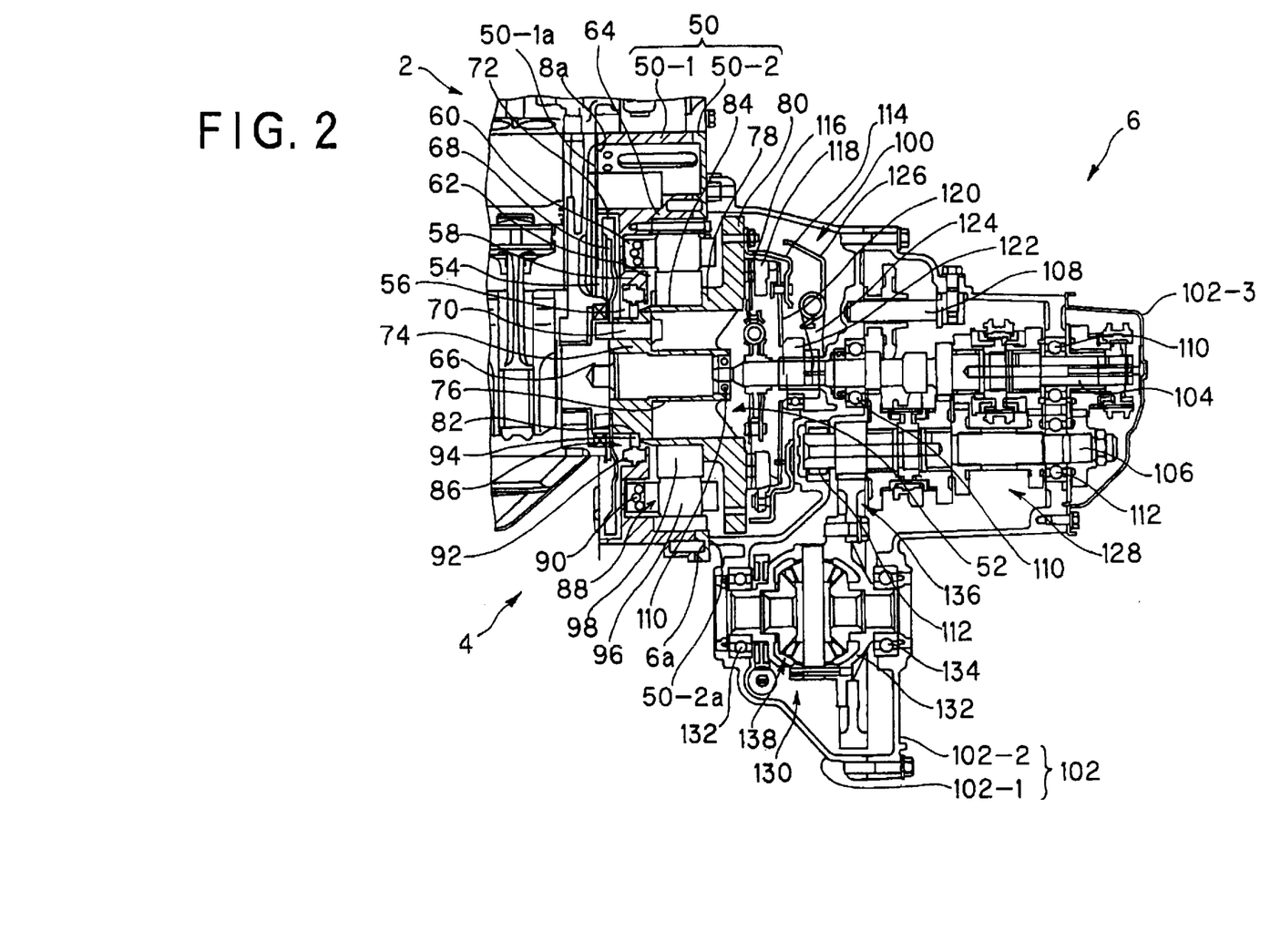
FIG. 2 is an enlarged cross-sectional view of the motor assist apparatus shown in FIG. 1.

The motor assist apparatus 4 is connected to the output end of crankshaft 26 of engine 2. In the motor assist apparatus 4, as shown in FIGS. 1 and 2, a motor housing 50 is mounted to one end face 8a of cylinder block 8 of engine 2 in the cylinder line direction, and a rotor member 52 is mounted to one end of crankshaft 26 in the cylinder line direction and aligned with the crankshaft axis.

The motor housing 50 consists of a first housing part 50-1 connected to the output end of cylinder block 8 and a second housing part or cover 50-2 connected to the input end of the casing of transmission 6.

In the first housing part 50-1, a first housing end face 50-1a is connected to the end face 8a disposed at one end of cylinder block 8. A gear ring hollow 54 is formed adjacent the first housing end face 50-1a, and a sensor hollow 56 is formed inwardly (i.e., rightwardly in FIG. 2) therefrom. Moreover, a sensor stator installing part 58 is formed on the first housing part 50-1. A cable hollow part 60 is formed radially outwardly of the sensor stator installing part 58. A motor hollow 62 is formed so as to adjoin the cable hollow 60 toward the transmission side. A motor stator installing part 64 is formed radially outside of and surrounds the motor hollow 62, and is fixed to housing part 50-2. The second housing part 50-2 is installed to cover the end of housing part 50-1 and extends outwardly from an outer circumferential side of the case part 102-1 of transmission 6. A second housing end face 50-2a is formed on the part 50-2 for engagement with the end face 6a of the transmission casing.

Figure 2A:
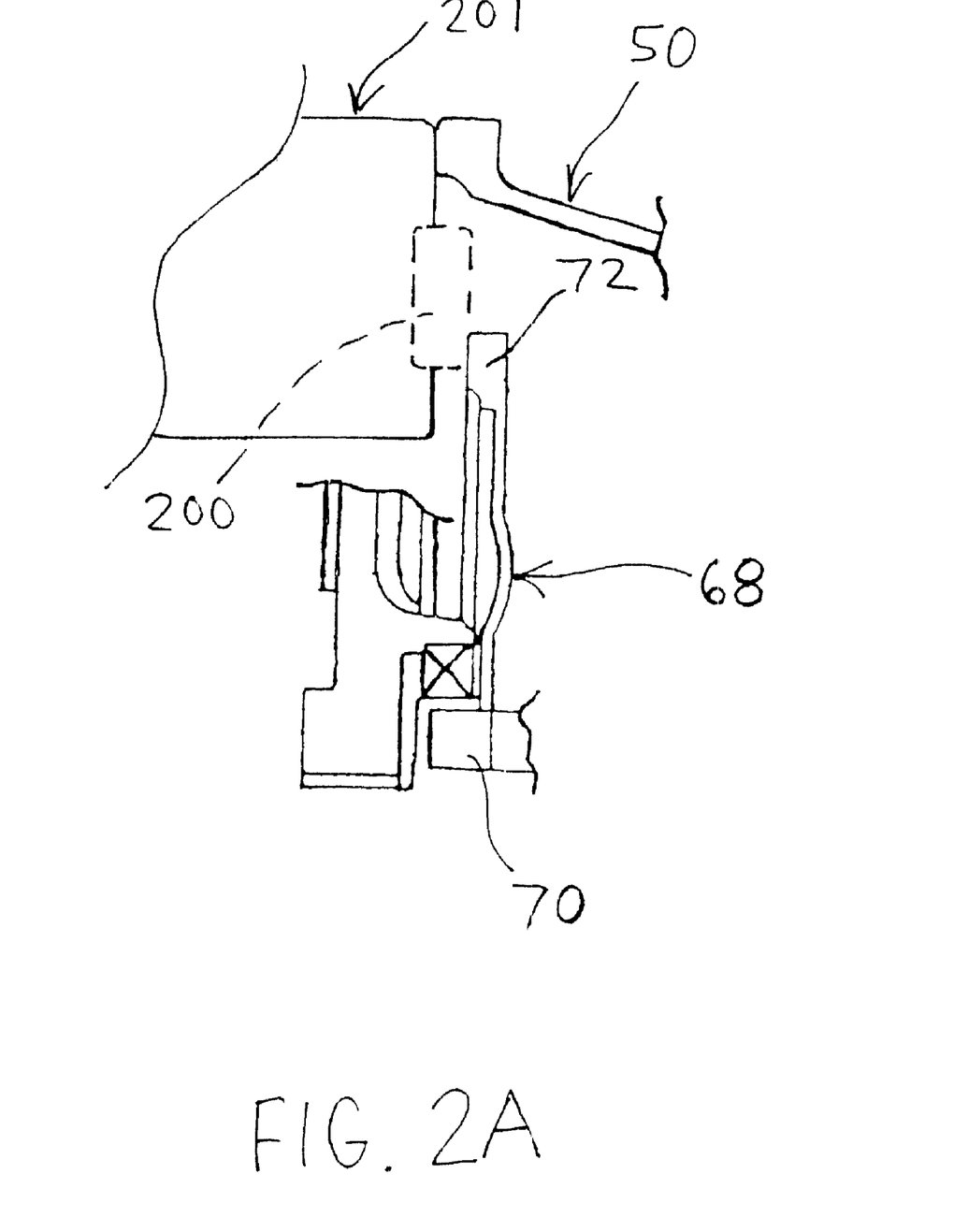
FIG. 2A is an enlarged view of the motor assist apparatus and its cooperation with a starter motor.

The rotor member 52 is mounted to flange part 66 at an output end of crankshaft 26 through a starter driving gear member 68 by a fixing bolt 70. The starter driving gear member 68 is formed by metal plate processing, and is located in gear ring hollow 54, and the outer circumference of gear member 68 has a starter driven gear 72 formed therein. A starter drive gear 200 of the starter motor 201 installed in motor housing 50 is engaged with driven gear 72 (FIG. 2A).

The rotor member 52 includes a motor side flange part 74 arranged adjacent and connected to the crankshaft flange part 66, and an inner cylindrical part 76 which joins to and extends coaxially toward the output end (i.e., toward transmission 6). In addition, an outer cylindrical part 78 joined to a circumference of the motor side flange part 74 extends coaxially toward the output end and concentrically surrounds the inner cylindrical part 76. A circular flywheel wheel 80, projecting in a radial direction, is mounted on an output end of the outer cylindrical part 78.

A sensor rotor installing part 82 is located radially outward of the motor side flange part 74, opposite to the sensor stator installing part 58 so as to position the sensor hollow 56 between these two parts. Radially outside the outside pipe part 78, a motor rotor installing part 84 is located opposite to the motor stator installing part 64 so as to define the motor hollow 62 therebetween.

The motor assist apparatus 4 includes a rotational position sensor 86, a motor 88 for assisting the driving force of the engine 2, and a motor cable 90 linked to the motor 88 and built in the motor housing 50. The rotational position sensor 86 consists of a sensor stator 92 and a sensor rotor 94. The motor 88 consists of a motor stator 96 and a motor rotor 98.

The rotational position sensor 86 is arranged in the sensor hollow 56. The sensor stator 92 is mounted to the sensor stator installing part 58 of the first housing part 50-1, and the sensor rotor 94 is mounted to the sensor rotor installing part 82 of rotor member 52 so as to be opposite the sensor stator 92. The motor 88 is arranged within the motor hollow 62. The motor stator 96 is mounted on motor stator installing part 64 of the first housing part 50-1, and the motor rotor 98 is mounted on the motor rotor installing part 84 of rotor member 52 so as to be opposite to the motor stator 96.

The motor cable 90 is linked to the motor stator 96. The motor cable 90 is arranged in cable hollow part 60, adjacent the end of engine 2, so as to extend out to the side of the engine. In the first housing part 50-1, rotational sensor 86 is disposed in the sensor hollow 56 arranged inside in a radial direction from cable hollow 60 which locates motor cable 90.

By this arrangement, in the motor housing 50 of the motor assist apparatus 4 for a vehicle, the starter drive gear member 68 that is driven by a starter motor, the rotational position sensor 86 that consists of sensor stator 92 and sensor rotor 94, and the assist motor 88 that consists of motor stator 96 and motor rotor 98, are disposed in this order from the engine 2 toward the transmission 6.

In motor assist apparatus 4, the transmission 6 is connected through clutch 100 to the output side of flywheel 80. A housing or case 102 of transmission 6 is attached to motor housing 50. Transmission case 102 connects first case part 102-1, second case part 102-2 and third case part 102-3 in this order away from motor assist apparatus 4.

The transmission 6 has an input axle 104, an output axle 106 and the reverse idler axle 108. The input axle 104 is supported by input side bearings 110 that are respectively supported on the output end of the cylindrical inside part 76, the first case part 102-1, and the second case part 102-2. The output axle 106 is supported by output side bearings 112 arranged on case part 102-1 and case part 102-2. The first reverse idler axle 108 is supported on the first case part 102-1 and the second case part 102-2.

The clutch 100 is established by a clutch cover 114 mounted to an outer circumferential edge of the output side of flywheel 80, a clutch disk 116 arranged so as to axially move but not rotate relative to input axle 104, a pressure plate 118 disposed at one side face of the clutch disk 116 of which the other side face is disposed opposite the flywheel 80, a diaphragm spring 120 of which an intermediate part in a radial direction is maintained and of which one side of an outer circumferential part contacts the pressure plate 118, a release bearing 122 which is supported on input axle 104 so as to axially move and which contacts an internal circumference of the diaphragm spring 120, a swinging release fork 124 for axially moving the release bearing 122, and a release spring 126 for returning the release fork 124.

The transmission 6 is disposed at the output end of clutch 104. In the transmission 6, a gear train 128 for front and reverse steps is arranged in the case 102 between input axle 104, output axle 106 and reverse idler axle 108.

In addition, in transmission 6, a differential case or housing part 132 of a differential gear mechanism 130 is supported on the first case part 102-1 and the second case part 102-2 by differential bearings 134. The differential gear mechanism 130 is connected with an output end of output axle 108 by a final slowdown gear train 136. The differential 130 has a differential gear arrangement 138 in differential case 132 and contacts right and left drive axles (not shown)

In this way, the motor assist apparatus 4 having the electric motor 88 assisting driving force of the engine 2 is built in the motor housing 50, and is arranged in series between the cylinder block 8 of the engine 2 (having three cylinders 28) and the case 102 of the transmission 6.

Figure 5:
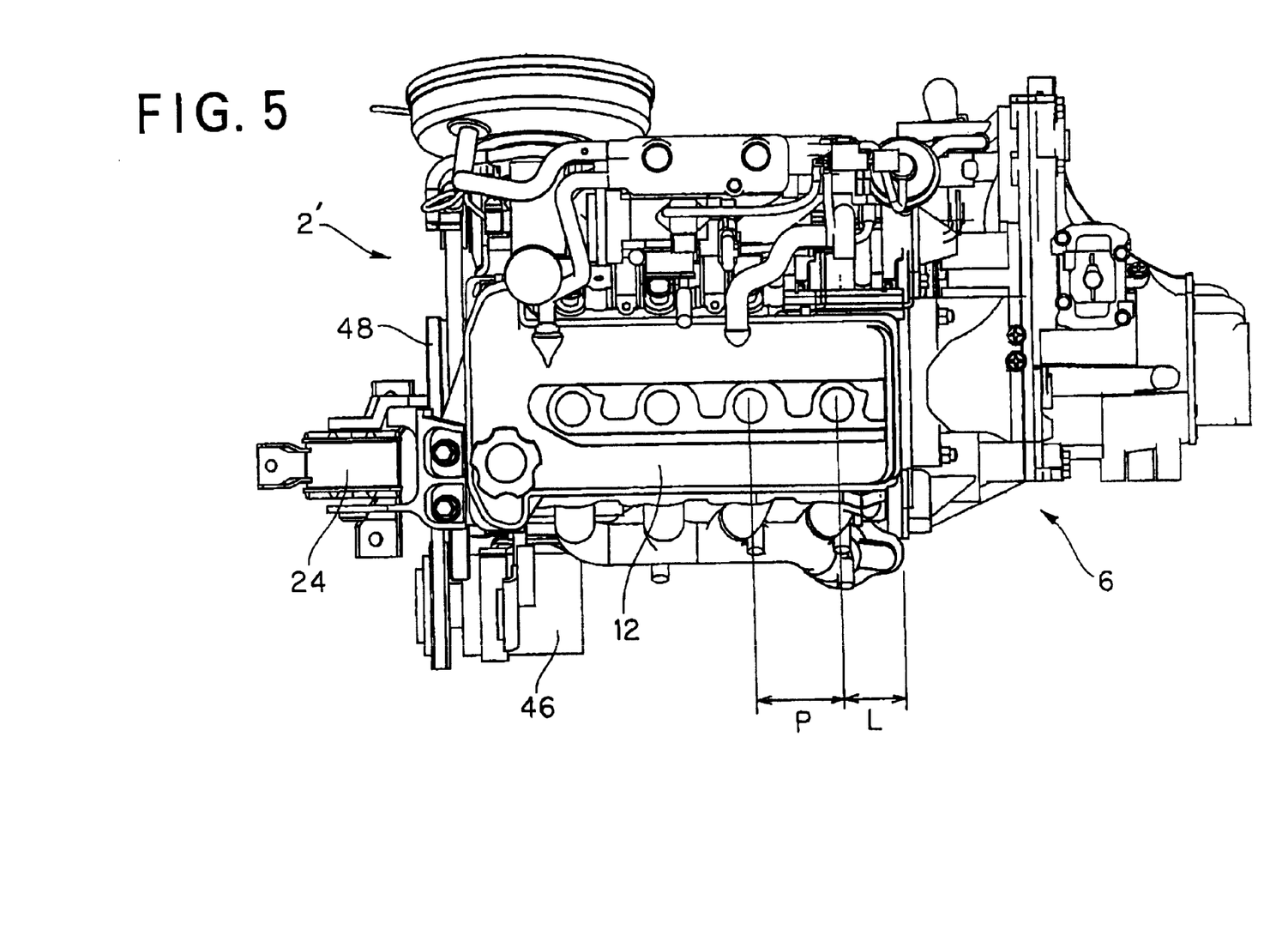
FIG. 5 is a plan view like FIG. 3 but showing an engine having one additional cylinder and connected directly to the transmission (without a motor assist apparatus)
Figure 6:
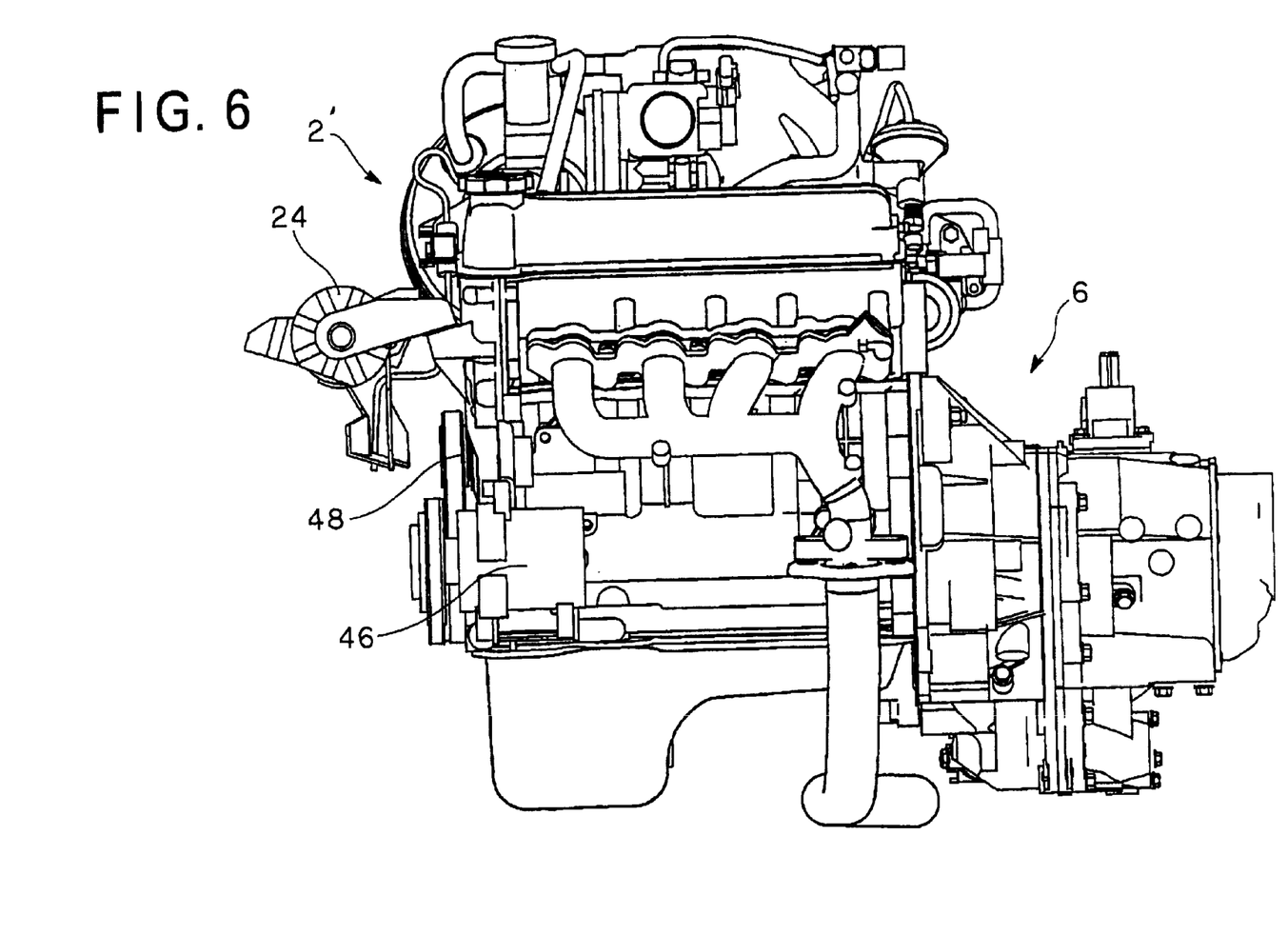
FIG. 6 is a front view of the engine shown in FIG. 5.

This motor assist apparatus 4 is constituted so as to utilize parts of engine mount 24 and drive lines of a typical 4-cylinder engine 2' (as shown in FIGS. 5 and 6) having four cylinders 28 in series.

In other words, in the motor housing 50, the starter drive gear member 68 driven by starter motor 201, the rotational position sensor 86 consisting of sensor stator 92 and sensor rotor 94, and the motor ss consisting of motor sensor 96 and motor rotor 98, are built in sequentially from the engine side toward the transmission side.

Moreover, in the motor housing 50, the direction to take out the motor cable 90 linked to motor stator 96 of motor 88 is arranged toward engine 2 side, and the rotational sensor 86 is arranged radially inwardly of the motor cable 90.

Incidentally, the starter drive gear member 68 is formed by metal plate processing, and the starter motor 201 to drive the starter drive gear member 68 is attached to the motor housing 50.

By such an arrangement, the motor assist apparatus 4 can build in the starter drive gear member 68, the rotational position sensor 86, the motor 88 and the motor cable 90 to ensure a compact layout in the motor housing 50. As a result, it is possible to shorten the length "W" of the motor housing 50 in the cylinder line direction, and as shown in FIG. 1, the length "W" of the motor housing 50 is set so as to be equal to the distance "P" between centers "C" of adjacent cylinders 28. Further, a distance "L" in the cylinder line direction between center C of the endmost cylinder 28 and block end face 8*a* in a 3-cylinder engine 2 (as shown in FIG. 1) is set so as to be equal to a distance "L" in the 4-cylinder engine 2' which connects directly to the transmission 6 (without using a motor assist apparatus) as shown in FIGS. 5 and 6.

In this way, the motor assist apparatus 4 can be coordinated so that the length in a cylinder line direction of a 3-cylinder engine 2 having motor 88 is the same as the length of a 4-cylinder engine 2' (see FIGS. 5 and 6). In addition, to adapt the motor assist apparatus 4 to a 3-cylinder engine 2 for the vehicle, it is possible to utilize part of an engine having one more cylinder (e.g., a 4-cylinder engine 2').

As a result, common use of parts and facilities can be fulfilled, and cost reduction can be achieved.

Figure 7:
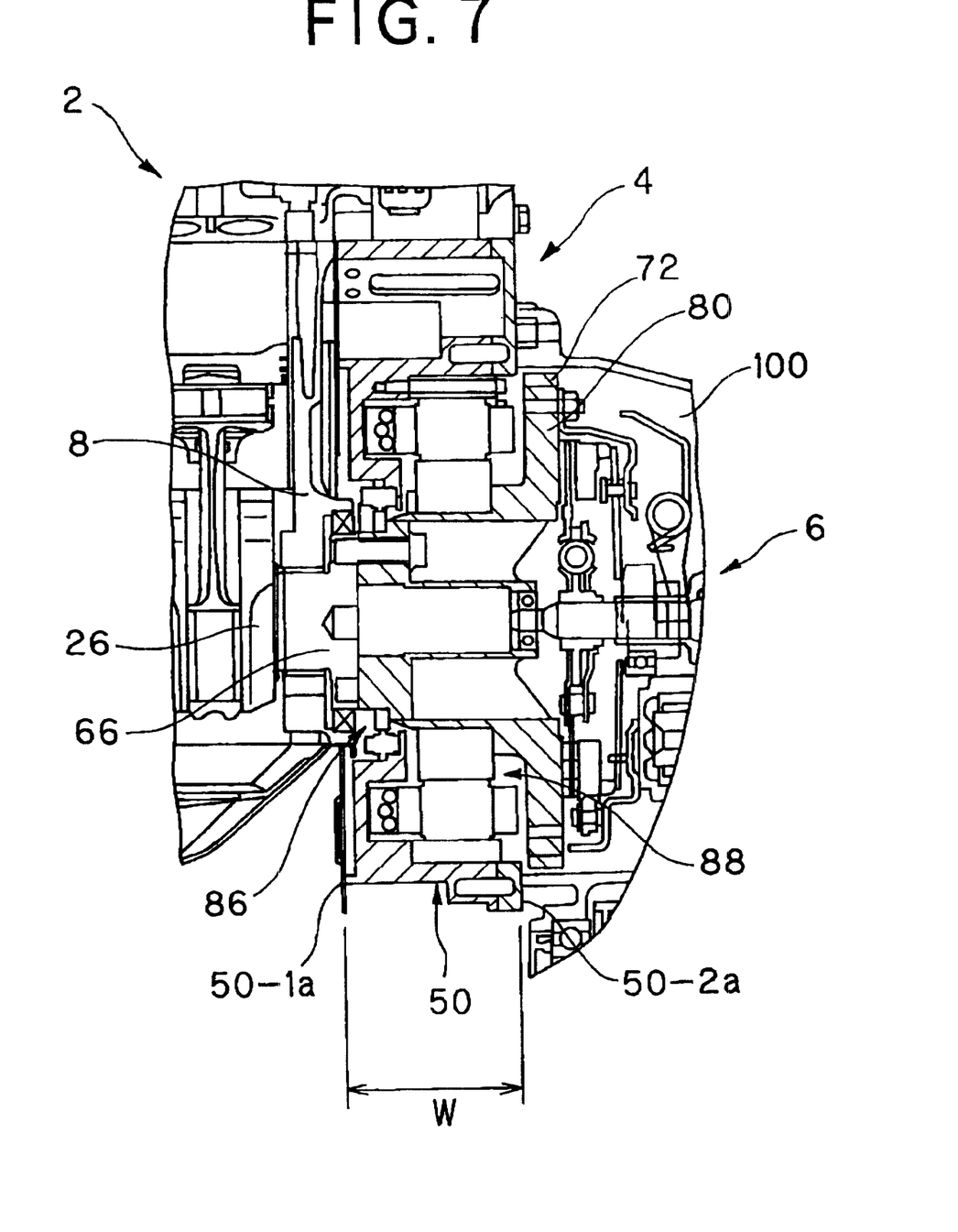
FIG. 7 is an enlarged cross-sectional view illustrating a main part of an engine, showing a second embodiment of a motor assist apparatus for a vehicle according to this invention.

FIG. 7 shows a second embodiment. In the motor assist apparatus 4 for a vehicle in the second embodiment, the starter drive gear member 68 is eliminated, and starter driven gear 72 is provided on the circumference of flywheel 80. In addition, the gear ring hollow 54 is eliminated, and in the motor housing 50 the rotational position sensor 86, motor 88 and motor cable 90 are arranged to approach the first housing end face 50-1*a* side, and the flywheel 80 is arranged to approach the second housing end face 50-2*a* side.

In the motor assist apparatus 4 for a vehicle of the second embodiment, by eliminating the starter drive gear member 68 and gear ring hollow 54, the rotational position sensor 86, the motor 88 and the motor cable 90 can be positioned more closely adjacent the engine 2 side than in the case of the first embodiment for ensuring a compact layout, and a compact motor assist apparatus 4 can be realized. As a result, the length "W" of motor housing 50 in the cylinder line direction can be shortened more easily. In addition, as rotational position sensor 86 and flywheel 80 approach the engine 2 side, heavy rotational bodies like sensor rotor 94, motor rotor 98 and flywheel 80 can be arranged to approach the axis of crankshaft 26 so that rotation balance improves and as a result a reduction of vibration noise can be achieved.

In the above embodiments, the transmission 6 for manual operation is exemplified, but it may be replaced with an automatic transmission utilizing a torque converter or a continuously variable transmission utilizing a pulley and belt. In addition, in the above embodiments, the length "W" of the motor housing 50 in the cylinder line direction is set to be equal to the distance "P" between the centers of adjacent cylinder 28, but the length "W" can be set to equal an integer times the distance "P", e.g. W equals 2P.

In this way, in the motor assist apparatus for a vehicle according to a preferred embodiment of this invention, the length in cylinder line direction of an engine having "N" cylinders can be set equal to a length of an engine having one additional cylinder, i.e. (N+1) cylinders. For example, this motor assist apparatus can be coordinated so that the length of a 3-cylinder engine having an assist motor becomes the same as the length of a 4-cylinder engine.

Although a particular preferred embodiment of the invention has been disclosed in detail for illustrative purposes, it will be recognized that variations or modifications of the disclosed apparatus, including the rearrangement of parts, lie within the scope of the present invention.

What is claimed is:

1. A motor assist apparatus for a vehicle having a motor for assisting driving force of a vehicle engine, the apparatus having a motor housing installed in series between a cylinder block of the vehicle engine and a case of a vehicle transmission, the motor housing having a length in the cylinder line direction which is equal to the distance between the centers of the cylinders of the engine, the motor housing having disposed therein, in order from the engine side toward the transmission, a starter drive gear, a rotational position sensor defined by a sensor stator and a sensor rotor, and the motor defined by a motor stator and a motor rotor, wherein a motor cable is linked to the motor stator and arranged in said motor housing toward the engine side, and the rotational position sensor is arranged radially inwardly of the motor cable.

2. A motor assist apparatus for a vehicle as defined in claim 1, wherein the starter drive gear is formed by metal plate processing.

3. A motor assist apparatus for a vehicle as defined in claim 1, the motor assist apparatus including a starter motor to drive the starter drive gear, the starter motor being mounted to the motor housing.

4. In a vehicle having an internal combustion engine including a plurality of cylinders which have centerlines disposed in a plane which extends parallel with a rotational axis of a rotatable crankshaft of the engine, the centerlines of adjacent cylinders being spaced a predefined distance apart along said axis, the engine having an engine block which terminates in an end face at an output end of the engine, a multi-speed transmission aligned with and driven by the engine, and a driving assist apparatus including an electric motor interposed in series between the output end of the engine and an input end of the transmission to assist in driving of the vehicle, comprising the improvement wherein the driving assist apparatus includes a motor housing which has one end connected to the end face of the engine block and the other end connected to an input end of a transmission casing, the motor housing mounting therein the motor, and the motor housing in the direction of said axis having a length which equals the predefined distance between adjacent said cylinders.

5. A vehicle according to claim 4, wherein the crankshaft has an output end which is disposed in the vicinity of said end face, and wherein the motor housing has disposed sequentially therein, in a direction toward the transmission, a starter drive gear connected to the output end of the crankshaft, a rotational position sensor including a sensor stator and a sensor rotor, and said motor including a motor stator and a motor rotor.

6. A vehicle according to claim 4, wherein a flywheel is positioned in the vicinity of the interface between the transmission housing and the motor housing.

7. A vehicle according to claim 6, wherein the motor housing has disposed sequentially therein, in a direction toward the flywheel, a rotation position sensor and said motor, and wherein a starter drive gear is mounted on said flywheel.

8. A vehicle according to claim 4, wherein the motor assist apparatus includes a starter drive gear member disposed within the motor housing, and a starter motor is mounted to the motor housing in driving engagement with said starter drive gear member.

9. A vehicle according to claim 4, wherein said motor assist apparatus includes a starter drive gear member, said starter drive gear member has an outer circumference which defines thereon a gear disposed to engage a starter drive gear of a starter motor, said starter motor being a separate component from said electric motor.

\* \* \* \* \*